United States Patent [19]

Quist et al.

[11] 3,887,385

[45] June 3, 1975

[54] DRY LIGHT-WEIGHT CEMENT COMPOSITION

[75] Inventors: Bernardus B. Quist, Amsterdam; Jacobus J. M. Zuiderwijk, Rijswijk, both of Netherlands

[73] Assignee: Shell Oil Company, Houston, Tex.

[22] Filed: May 9, 1974

[21] Appl. No.: 468,306

[30] Foreign Application Priority Data

May 17, 1973   Netherlands...................... 7306868

[52] U.S. Cl. ................................................. 106/96
[51] Int. Cl............................................... C04b 7/02
[58] Field of Search ........................................ 106/96

[56] References Cited

UNITED STATES PATENTS

| | | | |
|---|---|---|---|
| 1,744,869 | 1/1930 | Cross | 106/96 |
| 1,943,584 | 1/1934 | Cross | 106/96 |
| 3,036,633 | 5/1962 | Mathew | 106/96 |
| 3,220,863 | 11/1968 | Mathew | 106/96 |

*Primary Examiner*—J. Poer

[57] ABSTRACT

A dry mix for a light-weight cement comprises powdered cement mixed with bitumen particles of which more than 90% have sizes of less than 700 microns and aluminum silicate particles of which more than 90% have sizes of less than 30 microns.

8 Claims, 1 Drawing Figure

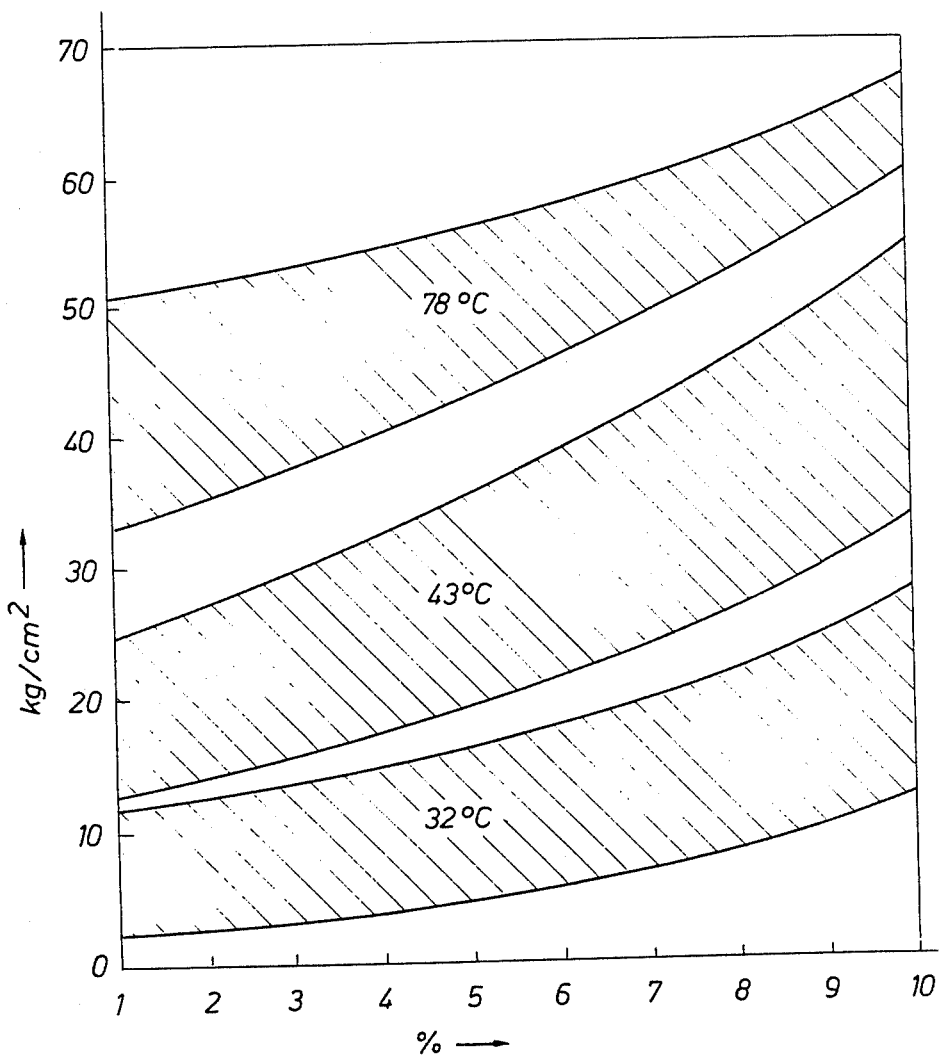

DRY LIGHT-WEIGHT CEMENT COMPOSITION

BACKGROUND OF THE INVENTION

The present invention relates to a dry light-weight cement composition, and in particular to such a composition that is adapted to be used in cementing boreholes that have been drilled in underground formations. Such underground boreholes are used for producing oil, water, gas and any other valuable products from underground formations.

When drilling an underground borehole into subsurface formations it is necessary from time to time to insert casing over at least part of the borehole and to cement this casing to the formation. For this purpose an aqueous cement slurry is pumped through the casing that is suspended in the borehole, after which the slurry with the mud following the slurry is pressed upwards through the annular space around the casing.

The pumping pressure under which the slurry is passed through the casing should be sufficiently high to overcome the frictional resistance which the slurry and the mud meet in the casing and the annular space. In the case of deep wells, however, the pressure in the cement slurry will often exceed the fracturing pressure of the formation, as a result of which the formation will break and slurry and/or mud will be lost into the formation. The same will be likely to occur in offshore wells where as a result of the difference in density between the column of sea water and the column of cement slurry of the same height, the pressure of cement at the bottom of the well is often higher than the formation fracturing pressure. In order to solve this problem it has already been proposed to reduce the density of the cement slurry by adding a filling agent consisting of bitumen particles thereto.

To prevent the decrease in strength of the cement after hardening, which decrease results from the addition of bitumen to the cement composition, it has already been proposed to add an aluminum silicate containing strengthening agent (possuolana) to the composition.

It has been found, however, that known light-weight cement compositions comprising a bituminous filling agent and "possuolana" do not meet the requirements set by the conditions met during the drilling operations that are nowadays carried out. These conditions require on the one hand an extremely small density of the cement slurry in order to prevent fracturing of the formation facing the borehole or well that is to be cemented, and on the other hand require a high compressive strength of the hardened cement.

It has now been found that these conflicting objectives can be met by the cement composition of the present invention. A further advantage of this cement composition is that during transport of the dry composition there is no risk of gravity separation of the components thereof which would require remixing of the composition prior to adding the required amount of water thereto to form the cement slurry. Still a further advantage is that the bitumen filling agent of the present cement composition is not subject to sticking, thereby allowing an easy transport of the dry light-weight composition from the manufacturing plant to the drilling field over very long distances and time periods, and under high temperature conditions.

SUMMARY OF THE INVENTION

This invention relates to a dry mix for a light-weight cement. The mix comprises powdered cement mixed with bitumen particles of which more than 90% have sizes of less than 700 microns and aluminum silicate particles of which more than 90% have sizes of less than 30 microns.

DESCRIPTION OF THE DRAWING

The drawing illustrates a graph of variations in compressive strength with increases in proportions of aluminum silicate in cement mixes of this invention.

DESCRIPTION OF THE INVENTION

In a preferred embodiment of the invention, the bituminous filling agent employed in the composition is obtained by precipitating bituminous particles from a residual crude oil fraction and grinding them so that over 90% by weight of the particles are smaller than 700 microns. Further, in the aluminum silicate particles the ratio of silica to alumina is preferably substantially equal to one.

By the present combination of particle sizes, a composition is obtained which can withstand severe transport conditions during which the composition is subjected to vibrations without showing any separation of the components thereof and/or subjected to pressure and/or heat without showing any sticking of the bitumen particles. Moreover, the composition shows a very desirable low density, without sacrificing, however, the compressive strength of the composition after hardening thereof. At least 50% by weight of the bitumen particles applied in the dry light-weight cement composition according to the invention, may be smaller than 250 microns. Also, all bitumen particles may be smaller than 500 microns and have an average size of 170 microns.

The bitumen applied in the present composition tends to be less noxious to the health of the people handling the bitumen when it is obtained by precipitation of a residual crude oil fraction. A "residual crude oil fraction" is a residual fraction obtained in the distillation of crude oil or shale oil or a component of such a fraction. Also included in such residual fractions are the residues obtained by distilling oils which have been obtained from crude oil by means of processes such as thermal or catalytic cracking processes. A heavy lubricating oil may be distilled off from a crude oil or from a fraction obtained from it by a certain treatment, generally at atmospheric or reduced pressure, after which the bitumen may be obtained from the residual fraction.

By means of precipitation, i.e., treatment with a precipitating agent (a selective solvent for the lighter components of the bitumens) the so-called precipitate bitumen is obtained from these residual fractions. Very suitable precipitating agents are propane and butane. The reason why the bitumens obtained by precipitation are so excellently suitable to be powdered is probably that the lighter components have substantially been removed, so that the bitumens naturally show less tendency to adhesion.

The bitumen may be blown bitumen which has the advantage of great hardness of the particles produced therefrom. By "blown" bitumen is understood the bitumen obtained by passing oxygen-containing gas (such as air) at elevated temperature through molten bitumen. Certain components of the bitumen are then wholly or partly oxidized in the appropriate places in the molecules. Blowing may be applied in combination with a precipitating treatment either before or after precipitation.

The bitumen particles or filling agent used in the present invention may be powdered by grinding bitumen lumps or by atomizing molten bitumen.

At least 95% by weight of the aluminum silicate used in the dry light-weight cement composition according to the invention may be smaller than 5 microns. Also, at least 80% by weight of the particles of the aluminum silicate may be smaller than 1000 Å.

The weight ration $SiO_2/Al_2O_3$ of the aluminum silicate may be equal to 1.

The aluminum silicate may be in the crystalline form (zeolites), which may consist of spent catalyst or molecular sieve used in the oil, petrochemical or chemical industries. Also, the aluminum silicate may comprise free and/or combined aluminum oxides and silicon oxides, obtained through precipitation by adding an aluminum compound or a solution thereof to a solution of a silicate.

The dry light-weight cement composition may comprise 0.5–2.0 parts by weight of cement and less than 0.2 part by weight of aluminum silicate per 1 part by weight of bitumen.

The invention will now be illustrated with reference to the following examples.

A blown Qater Marine propane bitumen, i.e., a bitumen derived from a crude oil from wells penetrating the sea bottom near Qater and obtained by means of a precipitation treatment of a residual fraction of this crude oil, followed by blowing the bitumen obtained with air, was powdered by grinding it to a relatively fine powder. In this way about 10 tons were obtained of a bitumen powder with a softening point (Ball and Ring) of 120°C and such a distribution of particle size that 100% of the particles was smaller than 500 microns, 80% by weight of the powder was formed by particles smaller than 300 microns, 60% by weight of the powder was formed by particles smaller than 200 microns, 30% by weight of the powder was formed by particles smaller than 100 microns and 10% by weight of the powder was formed by particles smaller than 70 microns. The average size of the particles of this bitumen powder was 170 microns. 5% by weight of aluminum silicate powder was added to these 10 tons of bitumen powder. 95% by weight of the aluminum silicate powder had a particle size of less than 5 microns. The density was 2.15 and the specific surface was about 120 $m^2$/gram.

The 10 tons of bitumen powder were thoroughly mixed with the aluminum silicate powder and thereafter transported over a substantial distance in a cement bulk carrier. No detrimental caking of the particles took place during this transport since the aluminum silicate powder acted as an anti-caking agent.

Subsequently, the mixture of bitumen powder and aluminum silicate powder was mixed by fluidization by means of air with 10 tons of oil-well cement of a type known under the commerical indication of "API class G". The pneumatic transport both of the mixture of bitumen and aluminum silicate powder immediately before mixing with the cement and of the final mixture of bitumen/aluminum silicate/cement did not present any difficulties regarding caking of particles or separation thereof, notwithstanding the fact that the density of the oil-well cement (3.2 grams/$cm^3$) was considerably higher than that of the bitumen powder (1.0 gram/$cm^3$).

The cement composition was subsequently mixed with the appropriate amount of water to form a pumpable slurry, which slurry was pumped through a cement string down into the hole to a level where the casing was to be cemented. The slurry entered the annular space around the casing and was retained therein to harden.

Based on the bitumen/aluminum silicate powder mixture prepared as described above, various mixtures were prepared with varying percentages of aluminum silicate with a weight ratio of cement/bitumen of 1.25 and a weight ratio of water/cement of 1.24. Provisions were made to ensure that each time the density of the fresh cement slurry was 1.3 g/$cm^3$.

The aluminum silicate had a double function, firstly to minimize the risk of caking of the particles of the bitumen powder, and secondly to increase the compressive strength of cement to which bitumen powder has been added for decreasing the density thereof.

The compressive strength of all mixtures was determined in special experimental samples of the cement slurry during 24 hours after hardening at a temperature of 20°C. However, for each mixture the temperature at which hardening took place was kept at three different values in different experimental samples, namely: 32°C, 43°C and 78°C.

The results of the measurements are incorporated in the graph shown in the drawing. In this graph the compressive strength of the hardened cement is indicated in kg/$cm^2$ and plotted against the content of aluminum silicate in a weight percentage. Three areas have been indicated in the graph for the three hardening temperatures mentioned above. The graph clearly shows that the addition of aluminum silicate has a positive influence on the compressive strength of the oil-well cement for each hardening temperature. It has also been found that a rise in the temperature at which hardening takes place will bring about an increase of the compressive strength.

Also, a batch of bitumen of the same type as described above, was ground less extensively, whereby 4 tons of bitumen powder were obtained with a particle size distribution such that 100% by weight of the particles was smaller than 2000 microns, and 90% by weight of the powder was small than 1000 microns. The average particle size was about 250 microns. The bitumen powder was subsequently mixed with 5% (by weight) of aluminum silicate (having a particle size less than 30 microns) and 5 tons of Pozmix cement. Once more no problems were encountered with mixing and pneumatic transport of the mixture with respect to caking and separation of bitumen/cement/aluminum silicate mixture.

Subsequently, various cement slurries with a water/cement ratio of 0.6 – 0.7 were tested. The compressive strength of these slurry samples was found to be below the requirement of 35 kg/$cm^2$ under standard conditions.

By replacing the 10% coarse bitumen particles, i.e., 10% particles greater than 1000 microns, by the same weight of particles smaller than 1000 microns, compressive strengths over 35 kg/$cm^2$ at the same conditions were found. The particle distribution of the bituminous component in these mixtures was the following:

| | |
|---|---|
| 100% by weight: | d < 1000 μ |
| 95% by weight: | d < 700 μ |
| 75% by weight: | d < 500 μ |

The average diameter $d_{50}$ was slightly less than 250 microns.

If desired, the bitumen powder may be mixed together with the cement and the aluminum silicate instead of first mixing the bitumen powder with the aluminum silicate followed by mixing the mixture thus obtained with cement.

As explained already above, the particle size of the bitumen powder may be chosen such that over 90% by weight of the particles is smaller than 700 microns. Good results will also be obtained when using bitumen powder in which over 50% by weight of the particles is smaller than 250 microns.

Further, the invention is not limited to the application of an aluminum silicate having the particle size mentioned in the examples described above. Good results will also be obtained by applying aluminum silicate having over 95% by weight of the particles with a diameter less than 5 microns. Extremely good results may be expected, however, when applying aluminum silicate of which at least 80% by weight of the particles is smaller than 1000 Å.

In an alternative embodiment of the invention, the aluminum silicate and/or the cement is added to the bitumen during the manufacture of the bitumen powder. In general, it can be said that in the method of preparing a dry light-weight cement composition according to the invention, the powdered bituminous filling agent is mixed during or at least as soon as possible after the manufacture thereof with at least a part of at least one of the other components of the composition.

What is claimed is:

1. A dry light-weight cement composition for use in an underground borehole, which composition comprises a mixture of cement, bituminous particles which are precipitated from a residual crude oil fraction and aluminum silicate particles, in which mixture more than 90% by weight of the bituminous particles are smaller than 700 microns, more than 90% by weight of the particles of the aluminum silicate are smaller than 30 microns, and from about 0.5 – 2.0 parts of weight of cement and less than about 0.2 part by weight of aluminum silicate are present per 1 part by weight of bitumen.

2. The cement composition of claim 1, wherein at least 50% by weight of the bituminous particles are smaller than 250 microns.

3. The cement composition of claim 1, wherein the bituminous particles are smaller than 500 microns and have an average size of 170 microns.

4. The cement composition of claim 1, wherein the bituminous particles consist of blown bitumen.

5. The cement composition of claim 1, wherein at least 95% by weight of the aluminum silicate particles are smaller than 5 microns.

6. The cement composition of claim 1 wherein at least 80% by weight of the aluminum silicate particles are smaller than 1000 A.

7. The cement composition of claim 1 wherein the weight ratio of $SiO_2/Al_2O_3$ in the aluminum silicate is substantially equal to 1.

8. The cement composition of claim 1 wherein the aluminum silicate comprises one or more zeolites.

* * * * *